June 5, 1934.    P. A. DE GROOT    1,961,631
COMPOUND DRIP COFFEEPOT
Original Filed July 15, 1932
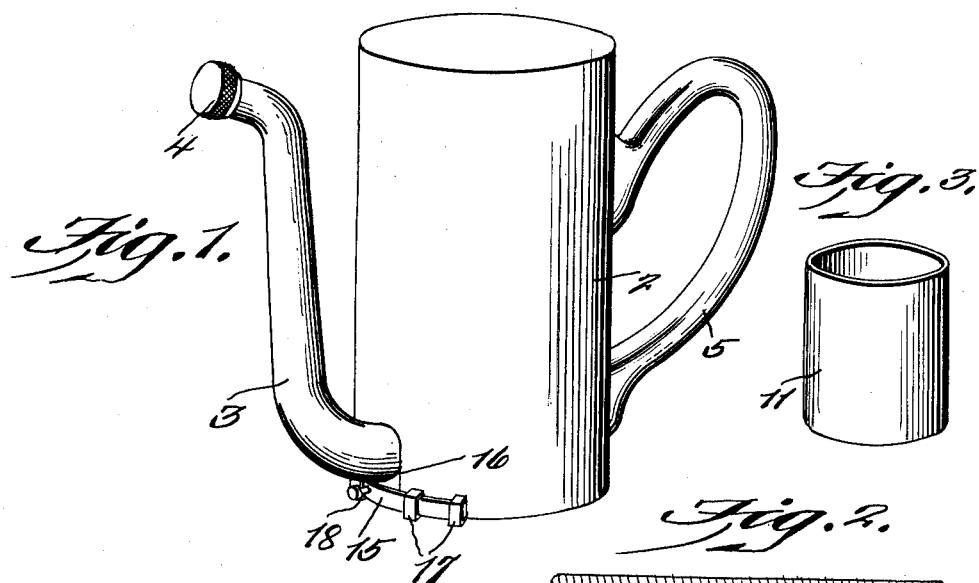
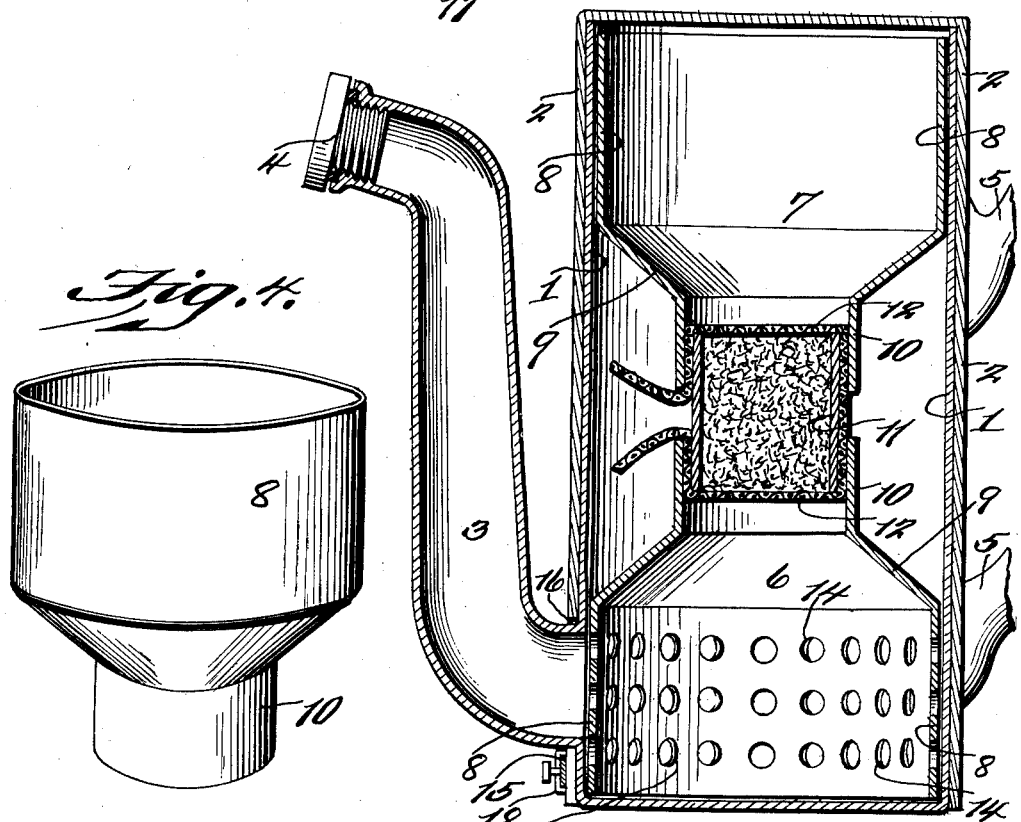
Perry A. De Groot INVENTOR
BY Victor J. Evans
ATTORNEYS

Patented June 5, 1934

1,961,631

UNITED STATES PATENT OFFICE 1,961,631

COMPOUND DRIP COFFEEPOT

Perry A. De Groot, Philadelphia, Pa.

Application July 15, 1932, Serial No. 622,747
Renewed May 2, 1934

3 Claims. (Cl. 53—3)

This invention relates to an improved compound drip coffee pot, wherein it is the purpose to support the ground coffee at a point intermediate the two ends of the pot, for the purpose of dripping the water back and forth through the coffee, by first disposing the coffee pot in an upright position and then inverting it, thereby repeating said operations until the coffee has dripped sufficient to give it the desired strength.

It is well known that this process of making coffee, where the pot has been used in its proper upright position and then inverted, has been previously employed in patents, but in such cases the intermediate compartment for the ground coffee is entirely of metal, and in order to pass the water back and forth through the coffee perforations are formed in the metal, and obviously these perforations become clogged, and furthermore the parts have screw thread connections, as well as cavities and other parts which are difficult to keep clean. It is well known that coffee pots if they are not kept thoroughly clean, a coffee scum is bound to collect on the metal, the thread connections being very difficult to keep the scum from collecting thereon. Furthermore if it is not possible to get at all parts of the coffee pot, as in some of these already patented pots, the coffee will not have the proper flavor, and a true coffee odor. The coffee will also have a bad taste from this collection of scum.

In the present invention all the parts of the pot are smooth and closely and properly fit, there being only five parts to the construction, hence a conserving on the cost of manufacturing.

Furthermore each and every part can be easily and very quickly cleaned with steel wool, all portions of the parts can be easily and very conveniently reached, so as to enable steel wool to be used for cleaning the parts and removing the scum that might collect, and in this way insuring producing coffee with a real coffee flavor and strength.

Another purpose is to provide, in a compound drip coffee pot, an inner sleeve section which telescopes similar cylindrical tubular portions of the opposed water receiving compartments, there being a piece of gauze, preferably cheese cloth or the like engaged over the ends of the cylindrical sleeve prior to inserting the sleeve into the opposed cylindrical ends of the water receiving compartments, thereby housing the ground coffee in the sleeve, the water adapted to drip back and forth through the gauze and through the ground coffee.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view in perspective of the improved coffee pot showing how one section telescopes over the other, with a latch to engage under the spout of the inner section of the coffee pot to hold the two sections in telescopical relation.

Figure 2 is a vertical sectional view through the same.

Figure 3 is a detail view of the cylindrical open ended sleeve.

Figure 4 is a detail view of one of the sections of the coffee pot which constitutes a water chamber or compartment.

Referring to the drawing 1 and 2 identify inner and outer sections of the coffee pot, and which are telescopically united. These sections may be any height and diameter and constructed of any suitable metal preferably a non-corrosive type, or if desired all parts of the pot may be silver plated or chromium plated.

The inner section 1 has an outlet spout 3, the outlet end of which may receive a stopper 4, to prevent the escape of coffee when the pot is inverted. The outer section has a conventional type of handle 5 whereby the pot is portable.

Telescopically fitting within the inner section 1 are sections 6 and 7 which receive the water for making the coffee. These sections each consist of a cylindrical portion 8, a tapered wall 9, and a contracted tubular open ended neck 10. Adapted to engage the open ended tubular neck 10 of the sections 6 and 7 is an open ended sleeve 11, over the opposite ends of which a piece of gauze, preferably unbleached cotton 12 is arranged prior to the insertion of the sleeve.

In fact the gauze is first placed over one end of the sleeve which is engaged telescopically in the tubular open ended part 10 of the section 6, the ground coffee is then placed within the sleeve, and the gauze pulled over the opposite end of the sleeve, which opposite end is inserted into the cylindrical open ended part 10 of the section 7, a sufficient amount of water being placed in the section 7. After the arrangement of the parts in this manner the section 2 of the coffee pot is telescopically fitted in the section 1. The pot is then placed over the blaze, the water percolating through the gauze and through the ground coffee down into the compartment of the section 6. Subsequently the pot can be inverted, in which case the water will percolate back through the ground coffee and the gauze into the compartment of the section 7. These operations may be repeated until the coffee has properly percolated in order to get the proper flavor and strength of the coffee.

When making coffee in this manner it is possible to use a considerably smaller quantity of ground coffee. The fact is the coffee will be substantially pulverized so that the full strength of the coffee can be produced.

The cylindrical part 8 of the section 6 has its wall provided with perforations 14, so that the coffee can be poured out through the spout 3. The section 2 which fits over the section 1 has a slot to straddle the spout at a point where it connects with the inner section 1, and adapted to fit over this slot is a latch member 15, so that when the handle 5 is grasped for pouring out the coffee the outer section 2 will not telescopically detach from the section 1.

The invention having been set forth, what is claimed is:

1. In a compound drip coffee pot, a casing having upper and lower liquid chambers, an intermediate open ended sleeve, said chambers having means telescopically receiving said sleeve, and a fabric gauze stretched over the opposite ends of the sleeve prior to the sleeve telescopically entering the telescoping means of the chambers, and an outlet spout communicating with one of said chambers, said casing adapted to be repeatedly inverted for percolating the liquid back and forth through the sleeve which is adapted to contain ground coffee, means on the outer section of the casing and cooperating with the spout for preventing telescopical separation of the two sections.

2. In a compound drip coffee pot, the combination with a casing comprising inner and outer sections, one of the sections having an outlet spout, of interior upper and lower sections telescopically fitting the inner section of the casing, said interior sections constituting opposed liquid chambers, an open ended sleeve telescopically fitting the interior sections and provided with a fabric gauze stretched over the opposite ends of the sleeve prior to its telescopical engagement with the interior sections and adapted to contain a requisite quantity of ground coffee, whereby the liquid may percolate back and forth through the sleeve and the coffee grounds contained therein, means on the outer section of the casing and cooperating with the spout for preventing telescopical separation of the two sections.

3. In a compound drip coffee pot, a casing comprising inner and outer sections telescopically united, one section having an outlet spout, means on the outer casing and cooperating with the spout for preventing telescopical separation of the two sections, interior sections telescopically fitting the inner section of the casing and constituting liquid receiving chambers, one of said interior sections having perforations communicating with the outlet spout, said interior sections having contracted open ended cylindrical portions, an open ended sleeve telescopically fitting cylindrical portions of the interior sections and provided with a fabric gauze fitting over the open ends of the sleeve prior to its telescopical engagement with the cylindrical portions of the interior sections, thereby providing ground coffee receiving chamber, whereby upon repeated inversions of the casing liquid may percolate back and forth through the sleeve and through the ground coffee.

PERRY A. DE GROOT.